United States Patent [19]

Kettschau

[11] Patent Number: 4,706,176
[45] Date of Patent: Nov. 10, 1987

[54] CLOCKED DIRECT VOLTAGE CONVERTER

[75] Inventor: Hans-Jürgen Kettschau, Eckenhaid, Fed. Rep. of Germany

[73] Assignee: U.S. Philips Corporation, New York, N.Y.

[21] Appl. No.: 882,800

[22] Filed: Jul. 7, 1986

[30] Foreign Application Priority Data

Jul. 11, 1985 [DE] Fed. Rep. of Germany ....... 3524767

[51] Int. Cl.⁴ .......................................... H02M 3/335
[52] U.S. Cl. ........................................ 363/21; 363/97
[58] Field of Search ...................... 363/20, 21, 97, 131

[56] References Cited

U.S. PATENT DOCUMENTS

| | | | |
|---|---|---|---|
| 4,195,333 | 3/1980 | Hedel | 363/21 |
| 4,389,702 | 6/1983 | Clemente et al. | 363/21 |
| 4,438,485 | 3/1984 | Voigt | 363/21 |
| 4,495,554 | 1/1985 | Simi et al. | 363/41 X |
| 4,561,046 | 12/1985 | Kuster | 363/21 |
| 4,649,464 | 3/1987 | Shono | 363/21 |

Primary Examiner—Patrick R. Salce
Assistant Examiner—Marc S. Hoff
Attorney, Agent, or Firm—Robert T. Mayer; Bernard Franzblau

[57] ABSTRACT

A clocked direct voltage converter with potential separation includes a control circuit for controlling the switching times of a switching transistor arranged on the primary side of the voltage converter, in which voltage converter voltage proportional to an output quantity is chopped by a controllable switch. The chopped voltage is transmitted by a transformer to the primary side of the converter, is then rectified, filtered and supplied to the control circuit. In order to obtain the largest possible control range for the converter, a further transformer is provided which transmits oscillation signal of an oscillator of the control circuit to the controllable switch on the secondary side voltage converter. By means of this oscillation signal, the controllable switch is controlled.

15 Claims, 1 Drawing Figure

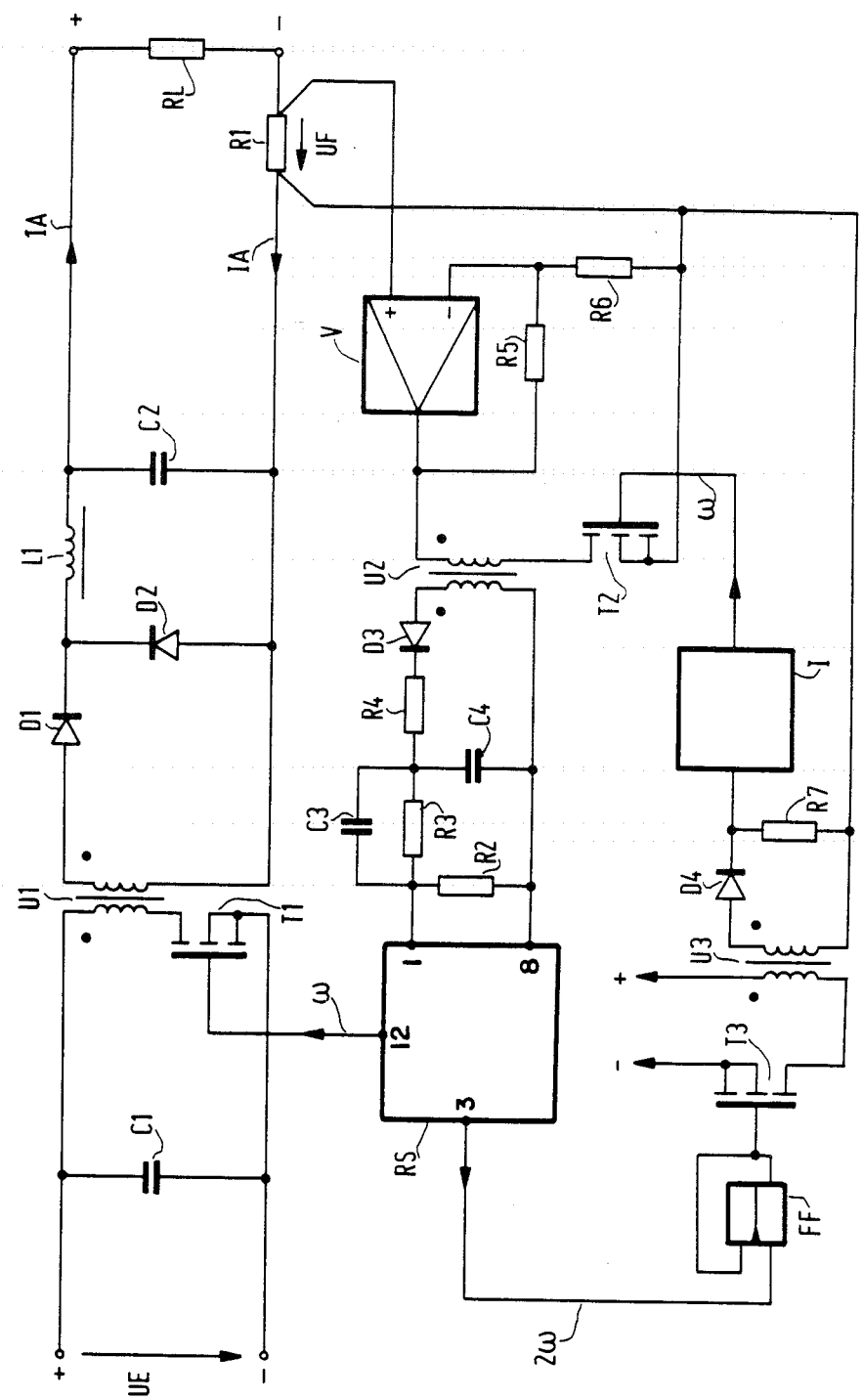

CLOCKED DIRECT VOLTAGE CONVERTER

BACKGROUND OF THE INVENTION

This invention relates to a clocked direct voltage converter with potential separation, in which a control circuit for controlling the transient times of a switching transistor is arranged on the primary side of the voltage converter, in which transistor a voltage proportional to an output quantity is chopped by means of a controllable switch. The chopped voltage is transmitted by a transformer to the primary side, is then rectified, filtered and then supplied to the control circuit.

Such a direct voltage converter is known from U.S. Pat. No. 4,495,554. In the known direct voltage converter, the controllable switch, by means of which the output voltage is chopped, is driven by the pulsatory voltage, which appears across the two connections of the secondary winding of the power transformer.

The control of the controllable switch—in U.S. Pat. No. 4,495,554 a bipolar transistor—by the unfiltered output voltage of the converter has the disadvantage that the closure and opening times of the controllable switch depend upon the instantaneous duty cycle—i.e. upon the opening and closure times of the switching transistor of the direct voltage converter. With a decreasing duty cycle, the control becomes increasingly more inaccurate. If the duty cycle is zero, as, for example, under no-load conditions at the output of the converter, in the known direct voltage converter information about the output voltage can no longer be transmitted to the primary side of the voltage converter. The control of the controllable switch by means of the unfiltered output voltage therefore limits the control range and the control accuracy of the known direct voltage converter.

SUMMARY OF THE INVENTION

The invention has for an object to provide a direct voltage converter of the kind mentioned in the opening paragraph, whose control range and control accuracy are increased with respect to the control range and the control accuracy of the known direct voltage converter.

This object is achieved in that a further transformer is provided which transmits the oscillation of the oscillator of the control circuit to the secondary side of the voltage converter, and in that the controllable switch is controlled by means of this oscillation.

Due to the control of the controllable switch according to the invention, its opening and closure times are independent of the duty cycle of the converter. Therefore, at all values of the duty cycle, information about the output voltage of the converter can be transmitted to the primary side.

Since the controllable switch is controlled by means of a signal which is always synchronous with the signal by which the switching transistor is controlled, any occurring modulation products of both signals cannot have a frequency dependence varying with time. The suppression of such modulation products can therefore be attained by simple means.

Advantageous embodiments of the invention are indicated in the dependent claims.

BRIEF DESCRIPTION OF THE DRAWINGS

An embodiment of the invention will now be described more fully with reference to the accompanying drawing. The sole FIGURE of the drawing shows a down converter with the control according to the invention of the controllable switch.

DESCRIPTION OF THE PREFERRED EMBODIMENTS

The down converter shown in FIG. 1 converts an input voltage UE into an output current IA, the output current IA being used as a control quantity. The primary and secondary sides of the converter have a mutual potential separation (isolation). For the potential separation of the two sides, three transformers —U1, U2 and U3 are provided.

The primary circuit of the converter includes a filter capacitor C1 and a switching transistor T1 connected in series with the primary winding of the transformer U1. The secondary circuit includes, in the usual manner, the secondary winding of the transformer U1, two diodes D1 and D2, a choke L1 and a further charging capacitor C2. A resistor R1 is included as a current sensor in a series branch between the capacitor C2 and a load resistor RL. The voltage drop UF across the resistor R1 is proportional to the output current and IA is amplified by an amplifier V fed back through resistors R5 and R6. The output voltage of the amplifier V is proportional to IA and appears across the series arrangement of the primary winding of the transformer U2 and of the conductor path of a controllable switch T2. As shown in FIG. 1, this controllable switch is a field effect transistor T2 which is opened and closed by a square wave oscillation at the frequency $\omega$ and with a duty cycle of $\frac{1}{2}$. As a result, the output voltage of the amplifier V is chopped, and the chopped voltage is transmitted to the secondary side of the transformer U2 where it is rectified by means of a diode D3, is filtered by an RC low-pass filter R4, C4, and is passed through a voltage divider R2, R3, C3 having one branch which comprises a high-pass filter R3, C3, and then is supplied to a control circuit RS.

The high-pass filter R3, C3 eliminates in part the phase shift of the low-pass filter R4, C4 and thus stabilizes the control circuit of the converter.

The amplifier V is fed by an auxiliary voltage source (not shown) on the secondary side of the converter. The amplifier V serves to improve the signal-to-noise ratio of the control variable and to decouple the current sensor R1 and the switch T2 from each other.

The output voltage of the voltage divider R2,R3,C3 is proportional to the output current IA of the converter and is further processed by the control circuit RS. The control circuit RS is essentially a commercially available element (for example the SG 1524) for controlling the transient times (duty cycle) of the switching transistor T1. The supply voltage source of the element is not shown. The element comprises, inter alia, an oscillator which oscillates at the double switching frequency $2\omega$. This signal is available at terminal 3 of the integrated circuit SG1524 (control circuit RS).

The control circuit RS includes a frequency divider, to which the signal of frequency $2\omega$ is also applied. The $2\omega$ signal is internally divided by a factor of two and becomes available at terminal 12 of RS with a variable duty cycle. The duty cycle of the signal ($\omega$) at terminal 12 of RS is controlled by internal circuitry of RS, e.g. two NOR gates and a comparator with an output that controls the duty cycle. A first input of the comparator receives a sawtooth voltage from the oscillator. The second input of the comparator is coupled to receive the voltage available across resistor R2, and which is proportional to the current IA. The voltage level at the second input of the comparator determines the duty cycle of the voltage appearing at the output terminal 12 of the control circuit RS. Thus, the duty cycle of the voltage at terminal 12 of RS controls the gate of transistor T1 so that its duty cycle is proportional to the current IA. The signal of frequency $2\omega$ at terminal 3 is passed to the clock input of a fed back flipflop FF, by means of which the oscillation of the oscillator is divided down to half its frequency (i.e. to the frequency $\omega$) and a constant duty cycle of $\frac{1}{2}$ (50%) is adjusted. The supply voltage source for the flipflop FF is not shown either. When the oscillator frequency $2\omega$ is divided down to the frequency $\omega$, the stability of the direct voltage converter is increased. Measures for making the converter stable are first directed to the switching frequency $\omega$. Since no other operating frequencies other than $\omega$ are introduced, filters for the suppression of interference induced in converter leads do not have to be redesigned. Thus, special measures to eliminate EMI are not required.

Fluctuations of the duty cycle of the oscillator frequency, which occur due to thermal effects or fluctuations of the supply voltages, are eliminated by the flipflop FF. As a result, the control accuracy of the converter is improved.

An output of the flipflop FF is connected to the control input of a switch in the form of a field effect transistor T3, whose conduction path is connected in series with the primary winding of the third transformer U3. The series arrangement is disposed between the two connections of a voltage source designated by the symbols + and −.

At the frequency $\omega$, the current through the transformer U3 is now interrupted. The pulses induced on the secondary side of the transformer U3 are passed, due to the presence of a diode D4 and a resistor R7, as a unipolar pulse sequence on to a pulse shaper stage I. The output of the pulse shaper stage I is connected to the control input of the transistor T2 acting as a switch.

What is claimed is:

1. A clocked direct voltage converter with potential separation comprising, a control circuit for controlling and regulating the switching times of a switching transistor connected on a primary side of the voltage converter, in which voltage converter a voltage proportional to an output quantity of the voltage converter is chopped by a controllable switch, the chopped voltage being transmitted to the primary side of the voltage converter and then rectified, filtered and supplied to the control circuit, characterized in that a transformer is provided which transmits an oscillation of an oscillator of the control circuit to a secondary side of the voltage converter and in that the controllable switch is controlled by means of said oscillation.

2. A clocked direct voltage converter as claimed in claim 1, characterized in that a frequency-divider is connected between the oscillator of the control circuit and the primary winding of the transformer and in that the frequency divider divides the frequency of the oscillation of the oscillator down to the switching frequency of the switching transistor.

3. A clocked direct voltage converter as claimed in claim 2, characterized in that the transmitted oscillation, before the controllable switch is controlled, passes through a pulse shaper stage for steepening the edges.

4. A clocked direct voltage converter as claimed in claim 1, characterized in that, after the voltage proportional to the output quantity has been filtered, a correction of the phase characteristic takes place on the primary side by means of a voltage divider, whose one branch is in the form of a high-pass filter.

5. A clock direct voltage converter as claimed in claim 1 wherein the voltage proportional to the output quantity passes through an amplifier having a high-ohmic input resistance.

6. A voltage isolated clocked direct voltage converter comprising:
a pair of input terminals for a source of voltage, a first transformer having a primary and a secondary winding, a switching transistor connected in series with said primary winding to said input terminals, a control circuit including an oscillator, means coupling said secondary winding to a load to supply an electric output quantity to the load, a second transformer having a secondary winding coupled to a control input of the control circuit via a rectifier circuit and a filter connected in cascade, a controllable switch coupled to a primary winding of the second transformer and to the secondary side of the first transformer so as to chop a voltage proportional to said output quantity, a third transformer having a primary winding responsive to an oscillation signal of the control circuit oscillator and a secondary winding coupled to a control electrode of the controllable switch whereby the controllable switch is controlled by said oscillation signal, and means coupling a control electrode of the switching transistor to an output of the control circuit.

7. A converter as claimed in claim 6 further comprising a frequency divider coupling the oscillation signal of the oscillator to the primary winding of the third transformer, the frequency divider dividing the oscillation frequency of the oscillator down to the switching frequency of the switching transistor.

8. A converter as claimed in claim 7 further comprising a pulse shaper stage connected in circuit between said oscillator and said controllable switch so as to sharpen the edges of the oscillation signal applied to the control electrode of the controllable switch.

9. A converter as claimed in claim 6 further comprising a voltage divider coupling said filter to said control input of the control circuit, one branch of said voltage divider having a high-pass filter for correcting the phase characteristic of a signal coupled from the secondary winding of the second transformer to the control input of the control circuit.

10. A converter as claimed in claim 7 further comprising an amplifier with a high-ohmic input resistance connected to couple said voltage proportional to the output quantity to said primary winding of the second transformer.

11. A converter as claimed in claim 6 wherein said electric output quantity is the load current and said output of the control circuit supplies to the switching transistor control electrode a control voltage having a duty cycle that is determined by the load current.

12. A converter as claimed in claim 6 wherein the output of the control circuit is a signal voltage of a frequency $\omega$ and with a duty cycle proportional to said electric output quantity, and said oscillation signal of the oscillator has a frequency $2\omega$, said converter further comprising a divide by two frequency divider coupled in cascade between an output of the oscillator and the control electrode of the controllable switch whereby control of the controllable switch is synchronous with the signal voltage which controls the switching transistor.

13. A direct voltage converter comprising:
a pair of input terminals for a source of d.c. voltage, a first transformer having a primary and a secondary winding, means coupling the primary winding to said input terminals, a switching transistor coupled to the primary winding so as to switch current from said input terminals through the primary winding, a control circuit including an oscillator, means coupling said secondary winding to a load to supply a load current thereto, means for deriving a voltage proportional to load current, a controllable switch responsive to said derived voltage, first voltage isolation means for coupling an oscillation signal of the oscillator to a control electrode of the controllable switch so that the controllable switch chops said derived voltage independent of the duty cycle of the switching transistor, and second voltage isolation means for coupling the chopped voltage to a control input of the control circuit whereby the control circuit supplies to a control electrode of the switching transistor a switching control voltage whose duty cycle is a function of the load current.

14. A converter as claimed in claim 13 further comprising a low pass filter and a high pass filter connected in cascade between said second voltage isolation means and said control input of the control circuit.

15. A converter as claimed in claim 13 wherein said switching control voltage has a frequency $\omega$ and said oscillation signal has a frequency $2\omega$, said converter further comprising a frequency divider coupled in cascade between an output of the oscillator and the control electrode of the controllable switch whereby control of the controllable switch is synchronous with the switching control voltage which controls the switching transistor.

* * * * *